April 14, 1970   SABURO KINOSHITA   3,506,340
OBJECTIVE FOR TAKING AND PROJECTING PICTURES
Filed Dec. 6, 1967   4 Sheets-Sheet 1

Longitudinal Wave Front aberration

United States Patent Office 3,506,340
Patented Apr. 14, 1970

1

3,506,340
OBJECTIVE FOR TAKING AND
PROJECTING PICTURES
Saburo Kinoshita, Akishima-shi, Tokyo, Japan, assignor to Konishiroku Photo Industry Co., Ltd., Tokyo, Japan
Filed Dec. 6, 1967, Ser. No. 688,516
Claims priority, application Japan, Dec. 6, 1966, 41/79,674
Int. Cl. G02b 9/00, 11/34
U.S. Cl. 350—214                    3 Claims

ABSTRACT OF THE DISCLOSURE

An optical objective for use in taking or projecting pictures in which various oberrations are highly corrected and which permits a reduction ratio of 1/100 or less. The objective comprises a first group consisting of a negative cemented meniscus lens component, a second group consisting of two positive lens components, of which one component is a cemented positive lens component, third and fourth groups each consisting of a negative cemented meniscus lens component, the meniscus lens components of the third and fourth groups having their concave surfaces spaced apart by an air space and opposed to each other, and a fifth group consisting of more than one positive lens components, of which at least one component is a cemented positive lens component, all of the groups being in optical alignment with each other and arranged in turn as they are numbered from the front of the objective.

Figure 1:
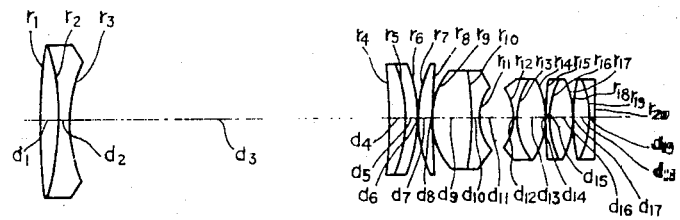

The invention relates to an optical objective for use in taking or projecting pictures in which spherical and chromatic aberatrions, coma, astigmatism, distortion and curvature of image field are highly corrected.

Development of light sensitive materials having ultra-high resolving power and availability of highly corrected objectives have presented the possibility of taking pictures on a super-micro scale or at a reduction ratio of 1/100 or less and of projecting pictures at a magnification which is the inverse of such value. Presently, however, such objective has been developed only to such extent that the available reduction ratio lies in the range between 1/4 and 1/25, so that the photographing on a reduced scale of 1/100 must be effected in two or more steps. Moreover, such objective has a field angle of 10° at the highest, which is of the order that slightly exceeds the field angle of a high magnification microscope. The field angle has been limited principally by the film thickness of a light sensitive layer. However, recent developments in the art of light sensitive layers has achieved a very thin film which has enabled the provision of super-micro objective of high magnification or reduction ratio and high field angle.

Therefore, it is an object of the invention to provide an objective which permits photographing usual documents and figures at a reduction ratio of 1/100 or less and to project figures at a corresponding magnification.

It is another object of the invention to provide an optical system which maintains sufficient sharpness of an original document when it is photographed or projected at a high reduction or magnification of 1:100. In order to achieve this, the optical system will have to have a resolving power of 500 to 750 lines per millimeter on the reduced image.

It is a further object of the invention to provide an optical system having a high relative aperture of at least $f/1.5$ in which various aberrations are sufficiently corrected so that they satisfy the Rayleigh limit known in the wave front aberration theory to thereby accomplish the above said resolving power.

It is a still further object of the invention to reduce the distance between an object and its image as much as possible in the photographing or projecting process. In order to accomplish this object, the optical system must have as high a field angle as possible. To keep the above mentioned high resolving power with a field angle in excess of 20°, it is necessary to create a novel optical system which is quite different from unkown microscope objectives.

It it a yet further object of the invention to provide an optical system which has a relatively long back focus with reference to the total focal length of the system, thereby providing sufficient working space.

The objective according to the invention is of inverse telephoto type and comprises five groups. Numbering from the front of the objective, the first group consists of a cemented negative meniscus lens component, the second group consists of two positive lens components which are spaced apart by a very small air space and of which at least one is a cemented positive lens component, the third and fourth groups each consist of a cemented negative meniscus lens component and have their respective concave surfaces spaced apart by an air space and opposed to each other, and the fifth group comprises at least two positive lens components spaced apart by a very small air space, of which at least one is a cemented positive lens component. Denting the total focal length of the whole system by $f$, the focal length of the first group by $f_1$, the axial separation between the first and second groups by $d_3$, and radii of curvature of the concave surfaces of the third and fourth groups which oppose each other with an air space interposed therebetween $r_{11}$ and $r_{12}$, respectively, the objective according to the invention must satisfy the following requirements:

(I)

$$4.5f > d_3 > 3f$$
$$6f > |f_1| > 4f$$
$$0.95f > r_{11} > 0.5f$$
$$f > |r_{12}| > 0.6f$$

The inequalities $4.5f > d_3 > 3f$ and $6f > |f_1| > 4f$ represent requirements which must be satisfied to obtain a long back focus while minimizing spherical and chromatic aberrations and coma and without unduly increasing the dimension of the objective. The conditions $$0.95f > r_{11} > 0.5f \text{ and } f > |r_{12}| > 0.6f$$

are necessary to eliminate higher order spherical aberration and coma flare which may occur in the intermediate part of the image field. Such elimination further requires that the second group comprises two positive lens components and that at the same time, the fifth group comprises at least two positive lens components.

Figure 3:
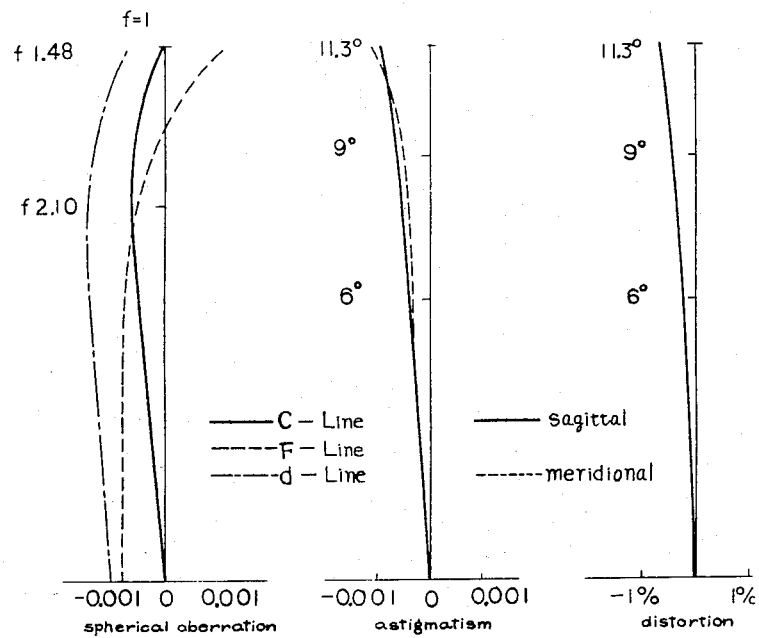
Figure 2:
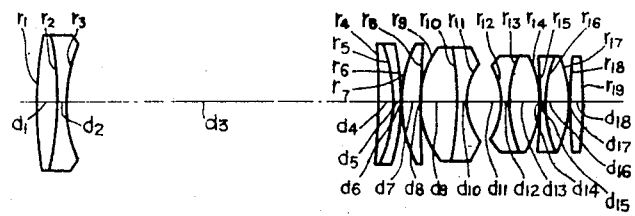
Figure 4:
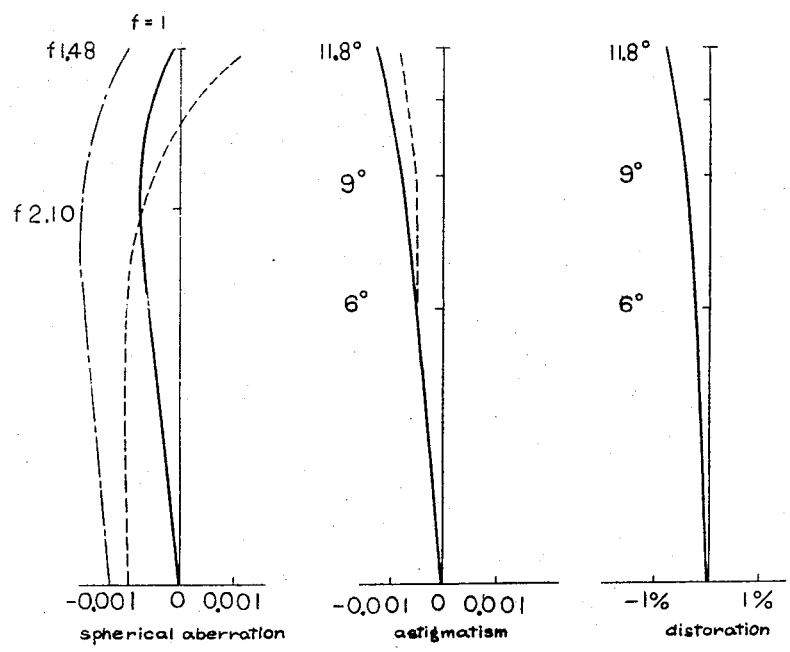
Figure 5:
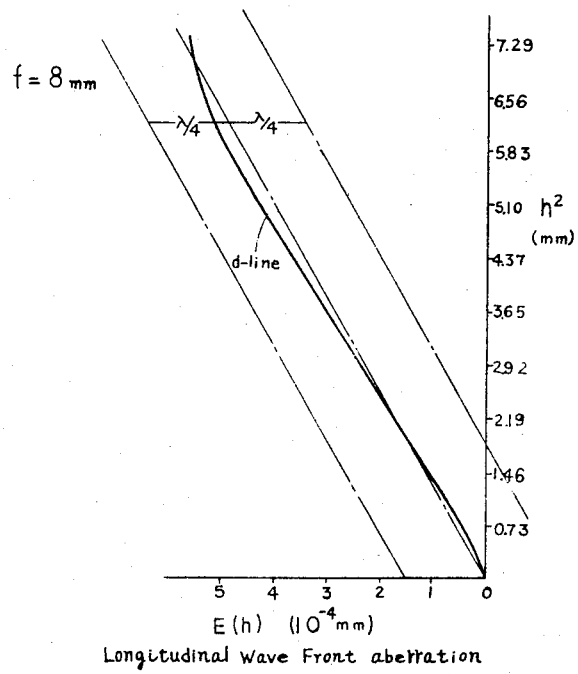
Figure 6:
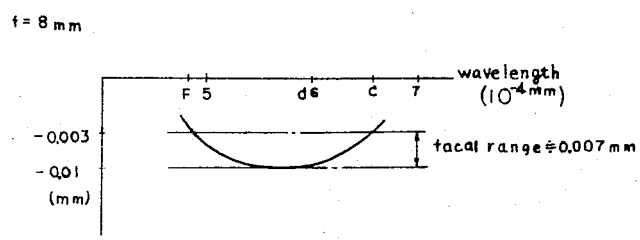
Figure 7:
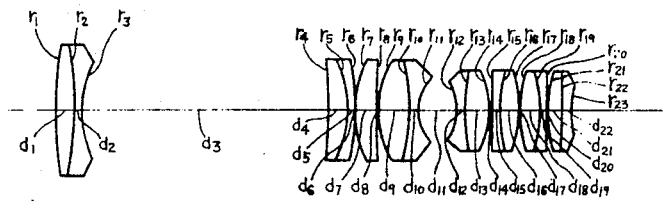
Figure 8:
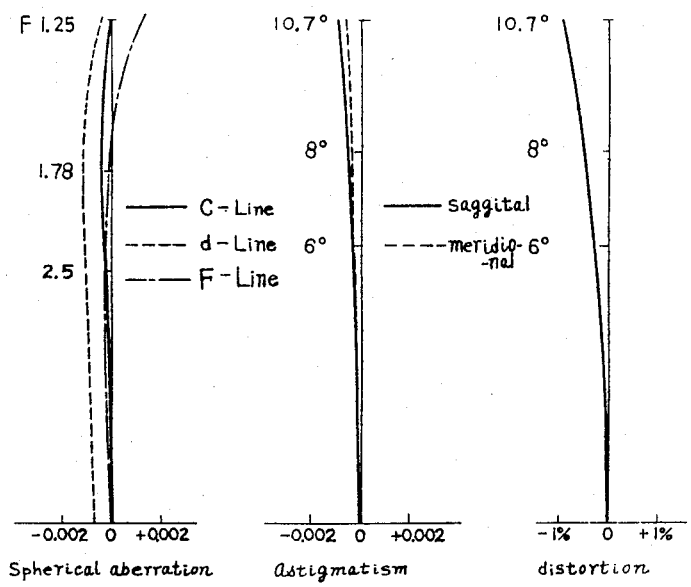

For better understanding of the invention, it will be described more particularly with reference to the drawing which shows several embodiments thereof and wherein:

FIGS. 1 and 2 are optical diagrams showing two embodiments of the objective according to the invention, FIGS. 3 and 4 are graphs showing spherical aberration, astigmatism and distortion occurring in the embodiments shown in FIGS. 1 and 2, respectively, FIG. 5 depicts spherical aberration, as converted to wave front aberration, of the embodiment shown in FIG. 1 for the d-line, FIG. 6 is a graph which is plotted to show the central optimum image positions for the embodiment shown in FIG. 1 with respect to C-, d- and F-lines, FIG. 7 is an optical diagram of a third embodiment of the objective according to the invention, and FIG. 8 shows graphs depicting spherical aberration, astigmatism and distortion of the objective shown in FIG. 7.

Referring first to FIGS. 1 and 2, there are shown two forms of the objective which satisfy the above requirements I and in which that component of the second group which lies nearer to the object is made as a cemented lens component and the fifth group consists of two positive lens components, one or both of which are made as cemented lens components. Denoting the radius of curvature of each refractive surface by $r$, the axial thickness of each lens element as well as axial separation between adjacent lens elements by $d$, and the refractive index for the d-line, the Abbe number and partial dispersion ratio $ng-nF/(nF-nC)$ of the glass from which each lens element is made by $n$, $\nu$ and $\theta$, respectively, where $ng$, $nF$ or $nC$ represents the refractive index of the glass for the g-, F- or C-line, respectively, it being understood that each denotation is followed by a figure or suffix to represent the position of an associated lens element or refractive surface numbering from the front of the objective, there is obtained an objective having a relative aperture of f/1.5 to f/1.4 and a reduction ratio in the order of 1/100 to 1/120 which can be applied to taking and projecting pictures with an excellent imaging performance, when its construction data satisfy the following requirements:

(II)

$$4f > |r_2| > 2.5f$$
$$n_1 - n_2 > 0.1$$
$$1.7f > r_{13} > f$$
$$0.15 > n_9 - n_8 > 0.05$$
$$|n_{10} - n_{11}| < 0.05$$
$$|n_{12} - n_{13}| < 0.05$$

(III)

$$40 > \nu_1$$
$$\nu_2 - \nu_1 > 15$$
$$0.59 > \theta_1$$
$$\theta_2 > 0.54$$
$$50 > \nu_7 > 40$$
$$50 > \nu_8 > 40$$
$$0.57 > \theta_7$$
$$0.57 > \theta_8$$

The conditions $4f > |r_2| > 2.5f$ and $n_1 - n_2 > 0.1$ are necessary to eliminate a negative distortion caused by the negative meniscus lens component of the first group while minimizing coma flare and curvature of image field in the meridional direction caused by the cemented surface $r_2$. Division of positive lens components of the second and fifth groups into a total of four components achieves a substantial reduction of spherical aberration in the whole system, but it was observed that the residue of overcorrected higher order spherical aberration by $r_{12}$ was still significantly large. Therefore, the requirements $$1.7f > r_{13} > f \text{ and } 0.15 > n_9 - n_8 > 0.05$$

provide a higher order spherical aberration which has an opposite sign to the first mentioned higher order spherical aberration to thereby compensate for the latter. When differences of refractive indices, $|n_{10} - n_{11}|$ and $|n_{12} - n_{13}|$, on opposite sides of each cemented surface in the positive lens components of the fifth group are large, coma flare and astigmatism due to each of these cemented surfaces increase sharply, and thus the invention provides the conditions $|n_{10} - n_{11}| < 0.05$ and $|n_{12} - n_{13}| < 0.05$. The above explains requirements II.

In order to suppress chromatic aberration of the whole system when it satisfies both requirements I and II, the system must additionally satisfy requirements III. The conditions for $\theta$ are provided under III for the purpose of reducing chromatic aberrations for the C-, d- and F-lines to sufficiently small values simultaneously. Each of the second and fifth groups must have at least one cemented surface to ensure good correction of chromatic aberration in the whole system. It will be apparent that it is advantageous for correction of chromatic aberration of the whole system to make both positive lens components of the fifth group as cemented lens components.

The following Tables 1 and 2 show numerical examples of constructional data on the two embodiments shown in FIGS. 1 and 2, respectively.

TABLE 1.—EMBODIMENT SHOWN IN FIGURE 1
[$f=1$.   Field Angle=22.6°.   $f/1.48$]

| | | | | |
|---|---|---|---|---|
| $r_1=7.600$ | $d_1=0.240$ | $n_1=1.74950$ | $\nu_1=35.0$ | $\theta_1=0.581$ |
| $r_2=-3.509$ | $d_2=0.090$ | $n_2=1.61720$ | $\nu_2=54.0$ | $\theta_2=0.554$ |
| $r_3=1.912$ | $d_3=3.800$ | | | |
| $r_4=-15.00$ | $d_4=0.200$ | $n_3=1.61700$ | $\nu_3=62.7$ | $\theta_3=0.538$ |
| $r_5=-1.320$ | $d_5=0.080$ | $n_4=1.61340$ | $\nu_4=43.9$ | $\theta_4=0.563$ |
| $r_6=-4.295$ | $d_6=0.0122$ | | | |
| $r_7=1.560$ | $d_7=0.190$ | $n_5=1.72916$ | $\nu_5=54.8$ | $\theta_5=0.543$ |
| $r_8=4.007$ | $d_8=0.0122$ | | | |
| $r_9=0.9650$ | $d_9=0.460$ | $n_6=1.56873$ | $\nu_6=63.1$ | $\theta_6=0.538$ |
| $r_{10}=-4.000$ | $d_{10}=0.080$ | $n_7=1.61340$ | $\nu_7=43.9$ | $\theta_7=0.563$ |
| $r_{11}=0.5518$ | $d_{11}=0.400$ | | | |
| $r_{12}=-0.7100$ | $d_{12}=0.060$ | $n_8=1.61340$ | $\nu_8=43.9$ | $\theta_8=0.563$ |
| $r_{13}=1.100$ | $d_{13}=0.320$ | $n_9=1.71300$ | $\nu_9=53.9$ | $\theta_9=0.544$ |
| $r_{14}=-1.294$ | $d_{14}=0.0122$ | | | |
| $r_{15}=-20.00$ | $d_{15}=0.060$ | $n_{10}=1.74950$ | $\nu_{10}=35.0$ | $\theta_{10}=0.581$ |
| $r_{16}=1.600$ | $d_{16}=0.220$ | $n_{11}=1.75500$ | $\nu_{11}=52.4$ | $\theta_{11}=0.543$ |
| $r_{17}=-1.801$ | $d_{17}=0.0122$ | | | |
| $r_{18}=1.930$ | $d_{18}=0.200$ | $n_{12}=1.75500$ | $\nu_{12}=52.4$ | $\theta_{12}=0.543$ |
| $r_{19}=-1.560$ | $d_{19}=0.060$ | $n_{13}=1.74950$ | $\nu_{13}=35.0$ | $\theta_{13}=0.581$ |
| $r_{20}=-18.14$ | | | | |

TABLE 2.—EMBODIMENT SHOWN IN FIGURE S
[$f=1$.   Field Angle=23.6°.   $f/1.48$]

| | | | | |
|---|---|---|---|---|
| $r_1=7.594$ | $d_1=0.240$ | $n_1=1.74950$ | $\nu_1=35.0$ | $\theta_1=0.581$ |
| $r_2=-3.210$ | $d_2=0.090$ | $n_2=1.60881$ | $\nu_2=58.9$ | $\theta_2=0.545$ |
| $r_3=1.559$ | $d_3=3.600$ | | | |
| $r_4=-12.01$ | $d_4=0.200$ | $n_3=1.71300$ | $\nu_3=53.9$ | $\theta_3=0.544$ |
| $r_5=-1.803$ | $d_5=0.080$ | $n_4=1.71736$ | $\nu_4=29.5$ | $\theta_4=0.598$ |
| $r_6=-3.849$ | $d_6=0.0122$ | | | |
| $r_7=2.221$ | $d_7=0.190$ | $n_5=1.69680$ | $\nu_5=55.6$ | $\theta_5=0.543$ |
| $r_8=13.63$ | $d_8=0.0122$ | | | |
| $r_9=1.170$ | $d_9=0.460$ | $n_6=1.57099$ | $\nu_6=51.0$ | $\theta_6=0.558$ |
| $r_{10}=-3.000$ | $d_{10}=0.080$ | $n_7=1.61340$ | $\nu_7=43.9$ | $\theta_7=0.563$ |
| $r_{11}=0.7180$ | $d_{11}=0.420$ | | | |
| $r_{12}=-0.8000$ | $d_{12}=0.070$ | $n_8=1.61340$ | $\nu_8=43.9$ | $\theta_8=0.563$ |
| $r_{13}=1.575$ | $d_{13}=0.330$ | $n_9=1.69680$ | $\nu_9=55.6$ | $\theta_9=0.543$ |
| $r_{14}=-1.368$ | $d_{14}=0.0122$ | | | |
| $r_{15}=-20.07$ | $d_{15}=0.070$ | $n_{10}=1.74077$ | $\nu_{10}=27.7$ | $\theta_{10}=0.608$ |
| $r_{16}=1.715$ | $d_{16}=0.260$ | $n_{11}=1.73400$ | $\nu_{11}=51.3$ | $\theta_{11}=0.546$ |
| $r_{17}=-2.059$ | $d_{17}=0.0122$ | | | |
| $r_{18}=2.820$ | $d_{18}=0.160$ | $n_{12}=1.69680$ | $\nu_{12}=55.6$ | $\theta_{12}=0.543$ |
| $r_{19}=-6.079$ | | | | |

As shown in FIGS. 3 and 4, various aberrations are very favorably corrected in both embodiments. FIG. 5 shows that the longitudinal wave front aberration for the reference wavelength completely satisfies the Rayleigh limit. As indicated in FIG. 6, the central optimum image positions for the C-, d- and F-lines lie within a narrow limit of about 0.007 mm., so that chromatic aberration may be substantially neglected for practical purposes. FIGS. 5 and 6 have been depicted for an objective having a total focal length of 8 mm. Traverse aberrations are corrected to a degree which corresponds to the longitudinal aberration.

When the above mentioned requirements are applied to the production of an objective having $f/1.25$ relative aperture and a reduction ratio in the order of $1/150$, the objective cannot have satisfactory imaging performance. This is principally due to remarkable deterioration of higher order spherical and chromatic aberrations, coma and curvature of image field. Investigations have shown that the second and thirteenth refractive surfaces which are both cemented surfaces have strong influence upon such aberrations, which influence increases sharply with increasing light quantity. Specifically, the second, cemented surface considerably increases the fall of the curvature of image field particularly in the meridional direction towards the negative side. The thirteenth, cemented surface not only increases coma flare and the fall of the curvature of image field in the meridional direction towards the negative side, but also deteriorate longitudinal and transverse chromatic aberrations. Such disadvantages are overcome by an arrangement shown in FIG. 7 in which the fifth group comprises three positive lens components, all of which are cemented lens components. Thus, by providing the following requirements (IV)

$$6f>|r_2|>4.5f$$
$$n_1-n_2>0.13$$
$$4f>r_{13}>2f$$
$$|n_{14}-n_{15}|<0.05$$

to such optical system, there is obtained an objective for taking and projecting pictures which has $f/1.25$ relative aperture and a reduction ratio in the order of $1/150$ and which exhibits satisfactory imaging performance.

The conditions $6f>|r_2|>4.5f$ and $n_1-n_2>0.13$ are effective to considerably reduce the fall of the curvature of image field in the meridional direction towards the negative side, which is caused by the second, cemented surface, without deteriorating distortion. The arrangement in which the fifth group comprises three positive lens components serves to prevent the increase of higher order chromatic aberration and coma flare, and since all of such three positive lens components are cemented lens components to share the correction of chromatic aberration, it is possible to provide the thirteenth surface with a relatively large radius of curvature. The condition $4f>r_{13}>2f$ is thus provided and is effective to the correction of the curvature of image field in the meridional direction and coma flare as well as chromatic aberration. The condition $|n_{14}-n_{15}|<0.05$ corresponds to the previously given conditions $|n_{10}-n_{11}|<0.05$ and $|n_{12}-n_{13}|<0.05$.

A numerical example of constructional data on this embodiment is given in the Table 3 herebelow wherein it is to be noted that numerical values given represent those used when a cover glass is inserted immediately before the imaging plane. Although the use of such cover glass slightly varies the balance of the imaging performance, it should be understood that any variation caused by the use of such cover glass in the balance of the imaging performance may be adjusted within the scope of the present invention. Also in the Table 3, $r_{24}$ and $r_{25}$ represent both surfaces of such cover glass, $d_{23}$ denotes axial separation between the eighth component and the cover glass, $d_{24}$ denotes axial thickness of the cover glass, and $n_{16}$, $\nu_{16}$ and $\theta_{16}$ denote the refractive index, the Abbe number and the partial dispersion ratio of the glass, respectively.

TABLE 3.—EMBODIMENT SHOWN IN FIGURE 7
$f=1$. Field Angle=22°. $f/1.25$]

| | | | | |
|---|---|---|---|---|
| $r_1=8.000$ | $d_1=0.319$ | $n_1=1.74950$ | $\nu_1=35.0$ | $\theta_1=0.581$ |
| $r_2=-5.316$ | $d_2=0.121$ | $n_2=1.58913$ | $\nu_2=61.2$ | $\theta_2=0.541$ |
| $r_3=1.827$ | $d_3=4.000$ | | | |
| $r_4=-6.990$ | $d_4=0.319$ | $n_3=1.61700$ | $\nu_3=62.7$ | $\theta_3=0.538$ |
| $r_5=-1.679$ | $d_5=0.121$ | $n_4=1.61340$ | $\nu_4=43.9$ | $\theta_4=0.563$ |
| $r_6=-3.298$ | $d_6=0.016$ | | | |
| $r_7=2.258$ | $d_7=0.319$ | $n_5=1.72916$ | $\nu_5=54.8$ | $\theta_5=0.543$ |
| $r_8=14.450$ | $d_8=0.016$ | | | |
| $r_9=1.500$ | $d_9=0.540$ | $n_6=1.56873$ | $\nu_6=63.1$ | $\theta_6=0.538$ |
| $r_{10}=-2.995$ | $d_{10}=0.121$ | $n_7=1.61340$ | $\nu_7=43.9$ | $\theta_7=0.563$ |
| $r_{11}=0.800$ | $d_{11}=0.640$ | | | |
| $r_{12}=-0.875$ | $d_{12}=0.100$ | $n_8=1.61340$ | $\nu_8=43.9$ | $\theta_8=0.563$ |
| $r_{13}=2.995$ | $d_{13}=0.440$ | $n_9=1.71300$ | $\nu_9=53.9$ | $\theta_9=0.544$ |
| $r_{14}=-1.534$ | $d_{14}=0.016$ | | | |
| $r_{15}=-25.011$ | $d_{15}=0.100$ | $n_{10}=1.74950$ | $\nu_{10}=35.0$ | $\theta_{10}=0.581$ |
| $r_{16}=2.004$ | $d_{16}=0.340$ | $n_{11}=1.75500$ | $\nu_{11}=52.4$ | $\theta_{11}=0.543$ |
| $r_{17}=-2.117$ | $d_{17}=0.016$ | | | |
| $r_{18}=2.004$ | $d_{18}=0.340$ | $n_{12}=1.75500$ | $\nu_{12}=52.4$ | $\theta_{12}=0.543$ |
| $r_{19}=-2.004$ | $d_{19}=0.100$ | $n_{13}=1.74950$ | $\nu_{13}=35.0$ | $\theta_{13}=0.581$ |
| $r_{20}=\infty$ | $d_{20}=0.016$ | | | |
| $r_{21}=2.101$ | $d_{21}=0.235$ | $n_{14}=1.75500$ | $\nu_{14}=52.4$ | $\theta_{14}=0.543$ |
| $r_{22}=-12.013$ | $d_{22}=0.145$ | $n_{15}=1.74950$ | $\nu_{15}=35.0$ | $\theta_{15}=0.581$ |
| $r_{23}=1.717$ | $d_{23}=0.403$ | | | |
| $r_{24}=\infty$ | $d_{24}=0.508$ | $n_{16}=1.51823$ | $\nu_{16}=59.0$ | $\theta_{16}=0.545$ |
| $r_{25}=\infty$ | | | | |

FIG. 8 shows spherical aberration, astigmatism and distortion curves for this embodiment, which indicate that each of such aberrations is well corrected.

What is claimed is:

1. An objective for taking and projecting pictures having at least $f/1.5$ relative aperture and a reduction ratio of 1/100 or less, said objective comprising a first group consisting of a negative cemented meniscus lens component, a second group consisting of two positive lens components, of which one component is a cemented positive lens component, third and fourth groups each consisting of a negative cemented meniscus lens component, said meniscus lens components of the third and fourth groups having their concave surfaces spaced apart by an air space and opposed to each other, and a fifth group consisting of more than one positive lens components, of which at least one component is a cemented positive lens component, all of said groups being in optical alignment with each other and arranged in turn as they are named numbering from the front of said objective, said objective having the following constructional data;

where $f=1$,

| | | | | |
|---|---|---|---|---|
| $r_1=7.594$ | $d_1=0.240$ | $n_1=1.74950$ | $\nu_1=35.0$ | $\theta_1=0.581$ |
| $r_2=-3.210$ | $d_2=0.090$ | $n_2=1.60881$ | $\nu_2=58.9$ | $\theta_2=0.545$ |
| $r_3=1.559$ | $d_3=3.600$ | | | |
| $r_4=-12.01$ | $d_4=0.200$ | $n_3=1.71300$ | $\nu_3=53.9$ | $\theta_3=0.544$ |
| $r_5=-1.803$ | $d_5=0.080$ | $n_4=1.71736$ | $\nu_4=29.5$ | $\theta_4=0.598$ |
| $r_6=-3.849$ | $d_6=0.0122$ | | | |
| $r_7=2.221$ | $d_7=0.190$ | $n_5=1.69680$ | $\nu_5=55.6$ | $\theta_5=0.543$ |
| $r_8=13.63$ | $d_8=0.0122$ | | | |
| $r_9=1.170$ | $d_9=0.460$ | $n_6=1.57099$ | $\nu_6=51.0$ | $\theta_6=0.558$ |
| $r_{10}=-3.000$ | $d_{10}=0.080$ | $n_7=1.61340$ | $\nu_7=43.9$ | $\theta_7=0.563$ |
| $r_{11}=0.7180$ | $d_{11}=0.420$ | | | |
| $r_{12}=-0.8000$ | $d_{12}=0.070$ | $n_8=1.61340$ | $\nu_8=43.9$ | $\theta_8=0.563$ |
| $r_{13}=1.575$ | $d_{13}=0.330$ | $n_9=1.69680$ | $\nu_9=55.6$ | $\theta_9=0.543$ |
| $r_{14}=-1.368$ | $d_{14}=0.0122$ | | | |
| $r_{15}=-20.07$ | $d_{15}=0.070$ | $n_{10}=1.74077$ | $\nu_{10}=27.7$ | $\theta_{10}=0.608$ |
| $r_{16}=1.715$ | $d_{16}=0.260$ | $n_{11}=1.73400$ | $\nu_{11}=51.3$ | $\theta_{11}=0.546$ |
| $r_{17}=-2.059$ | $d_{17}=0.0122$ | | | |
| $r_{18}=2.820$ | $d_{18}=0.160$ | $n_{12}=1.69680$ | $\nu_{12}=55.6$ | $\theta_{12}=0.543$ |
| $r_{19}=-6.079$ | | | | | wherein
$f$ is the focal length of the objective,
$r$ is the radius of curvature,
$d$ is axial thickness,
$n$ is refractive index,
$\nu$ is Abbe number, and
$\theta$ is the partial dispersion ratio.

2. An objective for taking and projecting pictures having at least $f/1.5$ relative aperture and a reduction ratio of 1/100 or less, said objective comprising a first group consisting of a negative cemented meniscus lens component, a second group consisting of two positive lens components, of which one component is a cemented positive lens component, third and fourth groups each consisting of a negative cemented meniscus lens component, said meniscus lens components of the third and fourth groups having their concave surfaces spaced apart by an air space and opposed to each other, and a fifth group consisting of more than one positive lens component, of which at least one component is a cemented positive lens component, all of said groups being in optical alignment which each other and arranged in turn as they are named numbering from the front of said objective, said objective having the following constructional data:
where $f=1$

| | | | | |
|---|---|---|---|---|
| $r_1=7.600$ | | | | |
| | $d_1=0.240$ | $n_1=1.74950$ | $\nu_1=35.0$ | $\theta_1=0.581$ |
| $r_2=-3.500$ | | | | |
| | $d_2=0.090$ | $n_2=1.61720$ | $\nu_2=54.0$ | $\theta_2=0.554$ |
| $r_3=1.912$ | | | | |
| | $d_3=3.800$ | | | |
| $r_4=-15.00$ | | | | |
| | $d_4=0.200$ | $n_3=1.61700$ | $\nu_3=62.7$ | $\theta_3=0.538$ |
| $r_5=-1.320$ | | | | |
| | $d_5=0.080$ | $n_4=1.61340$ | $\nu_4=43.9$ | $\theta_4=0.563$ |
| $r_6=-4.295$ | | | | |
| | $d_6=0.0122$ | | | |
| $r_7=1.560$ | | | | |
| | $d_7=0.190$ | $n_5=1.72916$ | $\nu_5=54.8$ | $\theta_5=0.543$ |
| $r_8=4.007$ | | | | |
| | $d_8=0.0122$ | | | |
| $r_9=0.9650$ | | | | |
| | $d_9=0.460$ | $n_6=1.56873$ | $\nu_6=63.1$ | $\theta_6=0.538$ |
| $r_{10}=-4.000$ | | | | |
| | $d_{10}=0.080$ | $n_7=1.61340$ | $\nu_7=43.9$ | $\theta_7=0.563$ |
| $r_{11}=0.5518$ | | | | |
| | $d_{11}=0.400$ | | | |
| $r_{12}=-0.7100$ | | | | |
| | $d_{12}=0.060$ | $n_8=1.61340$ | $\nu_8=43.9$ | $\theta_8=0.563$ |
| $r_{13}=1.100$ | | | | |
| | $d_{13}=0.320$ | $n_9=1.71300$ | $\nu_9=53.9$ | $\theta_9=0.544$ |
| $r_{14}=-1.294$ | | | | |
| | $d_{14}=0.0122$ | | | |
| $r_{15}=-20.00$ | | | | |
| | $d_{15}=0.060$ | $n_{10}=1.74950$ | $\nu_{10}=35.0$ | $\theta_{10}=0.581$ |
| $r_{16}=1.600$ | | | | |
| | $d_{16}=0.220$ | $n_{11}=1.75500$ | $\nu_{11}=52.4$ | $\theta_{11}=0.543$ |
| $r_{17}=-1.801$ | | | | |
| | $d_{17}=0.0122$ | | | |
| $r_{18}=1.930$ | | | | |
| | $d_{18}=0.200$ | $n_{12}=1.75500$ | $\nu_{12}=52.4$ | $\theta_{12}=0.543$ |
| $r_{19}=-1.560$ | | | | |
| | $d_{19}=0.060$ | $n_{13}=1.74950$ | $\nu_{13}=35.0$ | $\theta_{13}=0.581$ |
| $r_{20}=-18.14$ | | | | | cal alignment with each other and arranged in turn as they are named numbering from the front of said objective, said objective having the following constructional data:
where $f=1$ TABLE 3.—EMBODIMENT SHOWN IN FIGURE 7
$f=1$. Field Angle=22°. $f/1.25$]

| | | | | |
|---|---|---|---|---|
| $r_1=8.000$ | | | | |
| | $d_1=0.319$ | $n_1=1.74950$ | $\nu_1=35.0$ | $\theta_1=0.581$ |
| $r_2=-5.316$ | | | | |
| | $d_2=0.121$ | $n_2=1.58913$ | $\nu_2=61.2$ | $\theta_2=0.541$ |
| $r_3=1.827$ | | | | |
| | $d_3=4.000$ | | | |
| $r_4=-6.990$ | | | | |
| | $d_4=0.319$ | $n_3=1.61700$ | $\nu_3=62.7$ | $\theta_3=0.538$ |
| $r_5=-1.679$ | | | | |
| | $d_5=0.121$ | $n_4=1.61340$ | $\nu_4=43.9$ | $\theta_4=0.563$ |
| $r_6=-3.298$ | | | | |
| | $d_6=0.016$ | | | |
| $r_7=2.258$ | | | | |
| | $d_7=0.319$ | $n_5=1.72916$ | $\nu_5=54.8$ | $\theta_5=0.543$ |
| $r_8=14.450$ | | | | |
| | $d_8=0.016$ | | | |
| $r_9=1.500$ | | | | |
| | $d_9=0.540$ | $n_6=1.56873$ | $\nu_6=63.1$ | $\theta_6=0.538$ |
| $r_{10}=-2.995$ | | | | |
| | $d_{10}=0.121$ | $n_7=1.61340$ | $\nu_7=43.9$ | $\theta_7=0.563$ |
| $r_{11}=0.800$ | | | | |
| | $d_{11}=0.640$ | | | |
| $r_{12}=-0.875$ | | | | |
| | $d_{12}=0.100$ | $n_8=1.61340$ | $\nu_8=43.9$ | $\theta_8=0.563$ |
| $r_{13}=2.995$ | | | | |
| | $d_{13}=0.440$ | $n_9=1.71300$ | $\nu_9=53.9$ | $\theta_9=0.544$ |
| $r_{14}=-1.534$ | | | | |
| | $d_{14}=0.016$ | | | |
| $r_{15}=-25.011$ | | | | |
| | $d_{15}=0.100\ 9$ | $n_{10}=1.74950$ | $\nu_{10}=35.0$ | $\theta_{10}=0.581$ |
| $r_{16}=2.004$ | | | | |
| | $d_{16}=0.340$ | $n_{11}=1.75500$ | $\nu_{11}=52.4$ | $\theta_{11}=0.543$ |
| $r_{17}=-2.117$ | | | | |
| | $d_{17}=0.016$ | | | |
| $r_{18}=2.004$ | | | | |
| | $d_{18}=0.340$ | $n_{12}=1.75500$ | $\nu_{12}=52.4$ | $\theta_{12}=0.543$ |
| $r_{19}=-2.004$ | | | | |
| | $d_{19}=0.100$ | $n_{13}=1.74950$ | $\nu_{13}=35.0$ | $\theta_{13}=0.581$ |
| $r_{20}=\infty$ | | | | |
| | $d_{20}=0.016$ | | | |
| $r_{21}=2.101$ | | | | |
| | $d_{21}=0.235$ | $n_{14}=1.75500$ | $\nu_{14}=52.4$ | $\theta_{14}=0.543$ |
| $r_{22}=-12.013$ | | | | |
| | $d_{22}=0.145$ | $n_{15}=1.74950$ | $\nu_{15}=35.0$ | $\theta_{15}=0.581$ |
| $r_{23}=1.717$ | | | | |
| | $d_{23}=0.403$ | | | |
| $r_{24}=\infty$ | | | | |
| | $d_{24}=0.508$ | $n_{16}=1.51823$ | $\nu_{16}=59.0$ | $\theta_{16}=0.545$ |
| $r_{25}=\infty$ | | | | | wherein
 $f$ is the focal length of the objective,
 $r$ is the radius of curvature,
 $d$ is axial thickness,
 $n$ is refractive index,
 $\nu$ is Abbe number, and
 $\theta$ is the partial dispersion ratio.

3. An objective for taking and projecting pictures having at least $f/1.5$ relative aperture and a reduction ratio of 1/100 or less, said objective comprising a first group consisting of a negative cemented meniscus lens component, a second group consisting of two positive lens components, of which one component is a cemented positive lens component, third and fourth group each consisting of a negative cemented meniscus lens component, said meniscus lens components of the third and fourth groups having their concave surfaces spaced apart by an air space and opposed to each other, and a fifth group consisting of more than one positive lens component, of which at least one component is a cemented positive lens component, all of said groups being in optical alignment with each other and arranged in turn as they are named numbering from the front of said objective, said objective having the following constructional data:
where $f=1$ wherein
 $f$ is the focal length of the objective,
 $r$ is the radius of curvature,
 $d$ is axial thickness,
 $n$ is refractive index,
 $\nu$ is Abbe number, and
 $\theta$ is the partial dispersion ratio.

References Cited
UNITED STATES PATENTS 1,955,590  4/1934  Lee _____ 350—215
2,780,139  2/1957  Lange _____ 350—215 X JOHN K. CORBIN, Primary Examiner